US005690983A

United States Patent [19]

Sponholtz

[11] Patent Number: 5,690,983
[45] Date of Patent: Nov. 25, 1997

[54] METHOD OF PRODUCING UNFROZEN EXPANDED ICE CREAM MIX POSSESSING SUPERIOR STORAGE AND SHELF-LIFE PROPERTIES

[75] Inventor: Per Sponholtz, Gentofte, Denmark

[73] Assignee: Tetra Laval Holdings & Finance S.A., Pully, Switzerland

[21] Appl. No.: 688,143

[22] Filed: Jul. 29, 1996

Related U.S. Application Data

[63] Continuation of Ser. No. 482,793, Jun. 7, 1995, abandoned, which is a continuation of Ser. No. 228,009, Apr. 15, 1994, abandoned, which is a continuation of Ser. No. 899,322, Jun. 16, 1992, abandoned.

[30] Foreign Application Priority Data

Jun. 18, 1991 [SE] Sweden .................. 9101883

[51] Int. Cl.⁶ .................................................. A23G 9/02
[52] U.S. Cl. .................. 426/566; 426/567; 426/399; 426/410
[58] Field of Search .................. 426/399, 115, 426/130, 112, 393, 414, 400, 401, 566, 567, 410

[56] References Cited

U.S. PATENT DOCUMENTS

| 2,563,278 | 8/1951 | Rummel et al. | 426/393 |
|---|---|---|---|
| 2,571,136 | 10/1951 | Horton | 426/393 |
| 2,686,128 | 8/1954 | Conti | 426/414 |
| 2,877,121 | 3/1959 | Anderson et al. | 426/393 |
| 3,063,845 | 11/1962 | Graves | 426/399 |
| 3,084,052 | 4/1963 | McLaughlin | 426/399 |
| 3,542,567 | 11/1970 | Finley et al. | 426/87 |
| 3,647,472 | 3/1972 | Speech et al. | 426/393 |
| 3,809,768 | 5/1974 | Berry | 426/399 |
| 4,282,262 | 8/1981 | Blake | 426/399 |
| 4,376,126 | 3/1983 | Evers | 426/399 |
| 4,452,823 | 6/1984 | Connolly et al. | 426/115 |
| 4,505,943 | 3/1985 | Dell et al. | 426/565 |
| 4,552,773 | 11/1985 | Kahn et al. | 426/564 |
| 4,571,338 | 2/1986 | Okonogi et al. | 426/399 |
| 4,725,445 | 2/1988 | Ferrero | 426/565 |
| 4,790,999 | 12/1988 | Ashmont | 426/115 |
| 4,798,313 | 1/1989 | Farley | 426/115 |
| 4,808,428 | 2/1989 | Forsstrom | 426/393 |
| 4,830,864 | 5/1989 | Zevlakis | 426/393 |

FOREIGN PATENT DOCUMENTS

1553349  9/1979  United Kingdom .

OTHER PUBLICATIONS

Penn State Ice Cream Short Course Penn State U. Jan. 1990.
Fundamentals of Dairy Chemistry, Wong et al Van Nostrand Pub. 1988 3rd Ed.
Elements of Food Technology, Desrosier Avi Publ. 1977.
Food Products Formulary, Tressler et al Avi Publ vol. 2 1975.
Wiley Encyclopedia of Packaging Technology 1986 J. Wiley & Sons.

*Primary Examiner*—Steven Weinstein
*Attorney, Agent, or Firm*—Burns, Doane, Swecker & Mathis, L.P.P.

[57] ABSTRACT

The disclosure relates to a method of producing and pre-distribution preparing unfrozen, expanded ice cream mix with superior storage and shelf-life properties.

Starting ingredients necessary for producing the ice cream mix are mixed together, whereafter the mix is heat-treated or otherwise treated so as to exterminate micro-organisms, in particular pathogenic bacteria, present in the mix. The thus treated mix is expanded and subsequently packed in packages ready for distribution.

Ice cream mix produced according to this method has extended shelf-life and can be stored in the unfrozen state for long periods of time with retained pristine freshness qualities, without any requirement of cold storage at extremely low storage temperatures. No Drawings.

15 Claims, No Drawings

METHOD OF PRODUCING UNFROZEN EXPANDED ICE CREAM MIX POSSESSING SUPERIOR STORAGE AND SHELF-LIFE PROPERTIES

This application is a continuation, of application Ser. No. 08/482,793, filed Jun. 7, 1995 which is a continuation of application Ser. No. 08/228,009 filed Apr. 15, 1994, which is a continuation of application Ser. No. 07/899,322, filed Jun. 16, 1992, now all abandoned.

TECHNICAL FIELD

The present invention relates to a method of producing and pre-distribution preparing unfrozen, expanded ice cream mix possessing superior storage and shelf-life properties.

BACKGROUND ART

The demand for ice cream and similar products is extremely seasonal and may even vary considerably from day to day during the peak season. In order to meet demand and be able to supply the products to keep pace with varying demand, a sufficient surplus of the products is, therefore, often produced during the off-season so as to cover the general increase in demand (and also expected temporary demand peaks) during the coming peak season. This often implies that large product stockpiles must be built up and stored for periods of time whose length cannot be foreseen.

Since products of the type mentioned here are extremely sensitive to storage and bacterial attack, it is important that the production and storage of such products be effected in such a manner and under such conditions that the risk of total quality loss or quality deterioration during the period of time from production and packaging of the products until their consumption is wholly eliminated or at any rate reduced to a minimum, such that it is possible for the products, after storage, to be consumed with substantially retained pristine freshness qualities and in a condition fully acceptable from the point of view of health.

In order to retain the freshness qualities of the produced product, such as flavour, colour, consistency, etc., it has hitherto often been necessary to store the packed product in cold storage adapted for this purpose and set at extremely low storage temperatures of as low as approx. −30° C.

Since cold storage is extremely energy- and cost-consuming, it has always been desired in this art to find alternative production and storage methods which, in terms of both energy and costs, consume less than the previously employed cold storage and which, at the same time, make possible a correct storage of the product from the points of view of consumer health and quality retention.

OBJECTS AND SUMMARY OF THE INVENTION

One object of the present invention is, therefore, to propose such a cost and energy-saving method to make possible storage of the packed product for lengthy storage times with retained or only insignificantly altered freshness qualities.

A further object of the present invention is to devise a method of producing an unfrozen, expanded ice cream mix which may be packed and stored with retained freshness qualities in consumer packages ready for distribution, without the requirement that storage take place at very low freezing temperatures as mentioned previously.

DETAILED DESCRIPTION OF THE INVENTION

These and other objects are attained according to the present invention in that the method described by way of introduction has been given the characterizing features that the starting ingredients necessary for producing the ice cream mix are mixed with one another; that the mix is heat-treated or otherwise treated in order to exterminate micro-organisms, in particular pathogenic bacteria, present in the mix; and that the thus treated mix is expanded and thereafter packed in packages ready for distribution.

This combination of characterizing features in the method according to the present invention will thus afford the major advantage compared with prior art technology that the unfrozen, expanded ice cream mix can be stored in the unfrozen state with retained freshness qualities for lengthy periods of time without the requirement that storage take place at extremely low freezing temperatures as has hitherto been necessary.

A further advantage afforded by the method according to the present invention is that the packaging cycle can be carried out continuously on an industrial scale, employs existing packaging machines and, thus, requires no extensive extra capital investment costs for new equipment. For example, the ice cream mix can be packed using modern, rational packaging machines of the type which, from one or more webs of a packaging material, both form, fill and seal the finished cartons or packages.

From, for example, a single web, such a prior art packaging machine produces finished consumer packages in that the web is first formed into a tube by both of the longitudinal edges of the web being joined together in an overlap seam or joint. The tube is filled with relevant product and is divided into closed package units by repeated transverse sealings of the tube across the longitudinal axis of the tube and below the product level in the tube. The cushion shaped package units are separated from one another by incisions in the transverse sealing zones and are given the desired geometric, normally parallelepipedic, final form by a further forming and sealing operation during which the double-walled triangular corner flaps of the packages are folded in and sealed in place against the outside of a closely adjacent package wall.

From, for example, two webs, another prior art packaging machine produces finished consumer packages in that the one web forming the side walls of the package is formed into a row of continuous U-shaped package sections. The other, forming the planar back and end walls (top and bottom) of the package, is given a corresponding profile by longitudinal folds of both edge portions of the second web. The webs are brought together and sealed to one another from either side of a product filler pipe disposed between the webs, for the formation of one row of combined packages, with the product cavity surrounding the product filler pipe. After filling, the product cavities are sealed by transverse sealings of both webs, for the formation of completely closed, filled packages which are thereafter separated from one another by incisions in the transverse sealing zones.

According to the present invention, it is further possible, using so-called aseptic packaging processes, to produce and pack unfrozen, expanded ice cream mix with considerably lengthened shelf-life. Fundamentally, the principle of the aseptic packaging technique is that both the product which is to be packed and the package in which the product is to be packed are heat-treated or otherwise treated in order to exterminate all micro-organisms present in the product and the package, respectively, and that the thus treated product is thereafter packed in the thus treated package under sterile packaging conditions in order to avoid reinfection of the product. This packaging technique has long been employed for packing liquid foods such as milk and juice, but has proved, according to the present invention, to be particularly advantageous in the packing of unfrozen, expanded ice cream mix and other ice cream-like products which are thereby given extraordinarily good shelf-life properties and can be stored with retained pristine freshness qualities for periods of time of considerable length (months) from the time of packing, and without any requirement that storage take place at extremely low or even moderately low storage temperatures.

DESCRIPTION OF ONE EMBODIMENT

The present invention will be described and explained in greater detail hereinbelow with the aid of an illustrative, non-restrictive embodiment which shows how, for example, an unfrozen, expanded ice cream mix with superior shelf-life properties can be produced and packed in consumer packages ready for distribution, employing the method according to the present invention.

In a first process step, the starting ingredients necessary for producing the ice cream mix are mixed together. In the Example, use was made of the following starting ingredients:

Fat 8.00%

MSNF 10.70%

Sugar 8.00%

Chocolate 2.50%

Cocoa 2.00%

Dextrose 9.00%

Mixture TS-D 434 (combined emulsifier and stabilizer) 2.55%

Mixture TS-D 434 is a specific emulsifying and stabilizing agent, manufactured by Grindsted Products (Denmark). Mixture TS-D 434, also known as WHIPPIDAN 500, consists of lactic acid ester of mono- or diglycerides of fat acids 20–30%, microcrystalline cellulose 20–30%, modified starch 20–30%, and gelatin 10–20%.

The mixture or ice cream mix had a TS content of 42.75%.

The thus obtained ice cream mix was homogenized and subjected to heat treatment (pasteurization) or sterilization treatment in order to exterminate micro-organisms, in particular pathogenic bacteria, which might be present in the ice cream mix.

In a second process step which, as opposed to the above-described first step, was carried out continuously, the pasteurized or sterilized ice cream mix was expanded under simultaneous cooling to approx. 5° C. with the aid of a conventional continuous ice cream freezer (or scrape heat exchanger), the expansion being pursued to an overrun of approx. 90%.

The expanded, cooled ice cream mix was filled into consumer packages ready for distribution with the aid of a previously known packing or filling machine of the type described above and which, from a web of a packaging material, forms, fills and seals the finished packages.

The thus produced packages could thereafter be stored for several weeks at normal refrigeration temperatures for foods of the order of magnitude of 5° C., without the flavour qualities or other product qualities such as consistency, colour, etc., of the packed product being affected.

The use of the TS-D 434 emulsifying and stabilizing agent results in an expanded ice cream mix having an attractive, porous swollen consistency which the product will retain during its whole shelf-life, without any tendency to collapse within the package. Unlike compositions employing prior art emulsifying and stabilizing agents, the compositions of the present invention will remain "expanded" during its entire shelf-life. This allows the ice cream mix to maintain freshness qualifies for considerable periods of time without requiring storage at extremely or even moderately low storage temperatures.

Thus, according to the present invention, it is possible in a simple and rational manner, and employing existing machinery, to produce and pack unfrozen, expanded ice cream mix and similar products with superior shelf-life properties which can be stored in the unfrozen state for several weeks without the chemical or physical qualities of the product deteriorating or being destroyed.

What we claim and desired to secure by Letters Patent is:

1. A method of producing and pre-distribution preparing unfrozen, expanded ice cream mix with superior storage and shelf-life properties comprising the steps of mixing together both the starting ingredients necessary for producing an ice cream mix and a combined emulsifier and stabilizer; said combined emulsifier and stabilizer consisting of a lactic acid ester of mono- or diglycerides of fatty acids 20–30%, microcrystalline cellulose 20–30%, modified starch 20–30%, and gelatin 10–20%; then homogenizing the ice cream mix, treating the homogenized ice cream mix to exterminate micro-organisms in the ice cream mix; continuously expanding the treated ice cream mix with cooling to about 5° C. until an overrun of about 90% is achieved, which expansion is retained during the shelf-life of said treated mix; and thereafter packing the expanded ice cream mix in packages ready for distribution employing a packing or filling machine, which from a web of a packaging material, forms, fills and seals the finished packages, and storing and distributing said unfrozen, expanded ice cream mix for a period of time at non-freezing refrigeration temperatures.

2. The method according to claim 1, wherein the ice cream mix is storable at about 5° C.

3. The method according to claim 1, wherein packing the expanded ice cream mix is simultaneous with producing the packages.

4. The method according to claim 1, wherein expanding and packaging of the ice cream mix are continuous.

5. The method according to claim 1, wherein packing the expanded ice cream mix in packages is carried out under aseptic conditions.

6. The method according to claim 1, wherein exterminating is carried out by heating.

7. The method according to claim 6, wherein heating is carried out by pasteurization.

8. The method according to claim 1, wherein extermination is carried out by sterilization.

9. The method according to claim 1, wherein the micro-organisms are pathogenic bacteria.

10. The method according to claim 1, further comprising the step of exterminating micro-organisms present in the packages before packing the packages with the ice cream mix.

11. The method according to claim 1, wherein the expanded ice cream mix is packed in packages formed from at least one web.

12. The method according to claim 1, wherein packing is carried out using packaging machines.

13. The method according to claim 1, wherein packing the expanded ice cream mix in packages is carried out under aseptic packaging conditions.

14. The method according to claim 1, wherein packing the expanded ice cream mix and producing the packages are carried out at the same rate.

15. The method according to claim 1, wherein expanding the treated ice cream mix is carried out by cooling.

* * * * *